(12) United States Patent
Maher

(10) Patent No.: US 6,339,765 B1
(45) Date of Patent: Jan. 15, 2002

(54) METHOD AND APPARATUS FOR DEFINING PRIVATE CURRENCIES

(75) Inventor: David P. Maher, Ponte Vedra Beach, FL (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/191,054

(22) Filed: Nov. 12, 1998

Related U.S. Application Data

(60) Provisional application No. 60/065,962, filed on Nov. 13, 1997.

(51) Int. Cl.[7] .............................. G06F 17/60; H04L 9/32
(52) U.S. Cl. ............................................. 705/41; 705/39
(58) Field of Search ............................. 705/41, 39, 26; 235/379; 380/24

(56) References Cited

U.S. PATENT DOCUMENTS

| | | | | |
|---|---|---|---|---|
| 4,309,569 A | | 1/1982 | Merkle | |
| 4,454,414 A | * | 6/1984 | Benton | 705/41 |
| 4,906,828 A | * | 3/1990 | Halpern | 235/379 |
| 5,461,217 A | * | 10/1995 | Claus | 235/380 |
| 5,799,087 A | * | 8/1998 | Rosen | 380/24 |
| 5,905,976 A | * | 5/1999 | Mjolsnes et al. | 705/39 |
| 5,963,648 A | * | 10/1999 | Rosen | 235/379 |
| 5,963,926 A | * | 10/1999 | Kumomura | 705/41 |
| 5,983,207 A | * | 11/1999 | Turk et al. | 705/39 |
| 5,987,438 A | * | 11/1999 | Nakano et al. | 705/41 |
| 5,999,625 A | * | 12/1999 | Bellare et al. | 380/24 |
| 6,014,648 A | * | 1/2000 | Brennan | 705/41 |
| 6,032,858 A | * | 3/2000 | Yazumi et al. | 235/379 |
| 6,047,067 A | * | 4/2000 | Rosen | 380/24 |
| 6,070,148 A | * | 5/2000 | Mori et al. | 705/26 |

FOREIGN PATENT DOCUMENTS

| | | | | |
|---|---|---|---|---|
| WO | WO9702538 | * | 1/1997 | G06F/17/60 |

OTHER PUBLICATIONS

"Overserved Smart Card Security"—Chapter 5.*
Smart Card Business—Com "Smart Card & Security Overview".*
"Virtual Cash Gets Real"—Lauren, Amy—Information Week n 736 pp 46–58 May 31, 1999.*
What is Mondex?.*
Chan, C An Overview of Smartcard Security.*
Smart Card Basics.com.*

* cited by examiner

Primary Examiner—Vincent Millin
Assistant Examiner—Geoffrey Akers
(74) Attorney, Agent, or Firm—Kenyon & Kenyon

(57) ABSTRACT

A method and apparatus for establishing and distributing a currency is disclosed. First, a user accesses a web site and downloads a form. The user completes and returns the form with a currency name, an initial amount of currency and other parameters which characterize the currency. Next, the system server checks to ensure the requested currency name is unique. If the name is unique, the system server and user's smart card employ a cryptographic key management system to establish the currency as a leaf in a currency tree on the user's smart card. A new root value is computed for the currency tree and saved in memory on the user's smart card. The user may then distribute the currency to other holders of smart cards from the same smart card issuer using the same cryptographic key management system employed between the system server and the user's smart card.

20 Claims, 3 Drawing Sheets

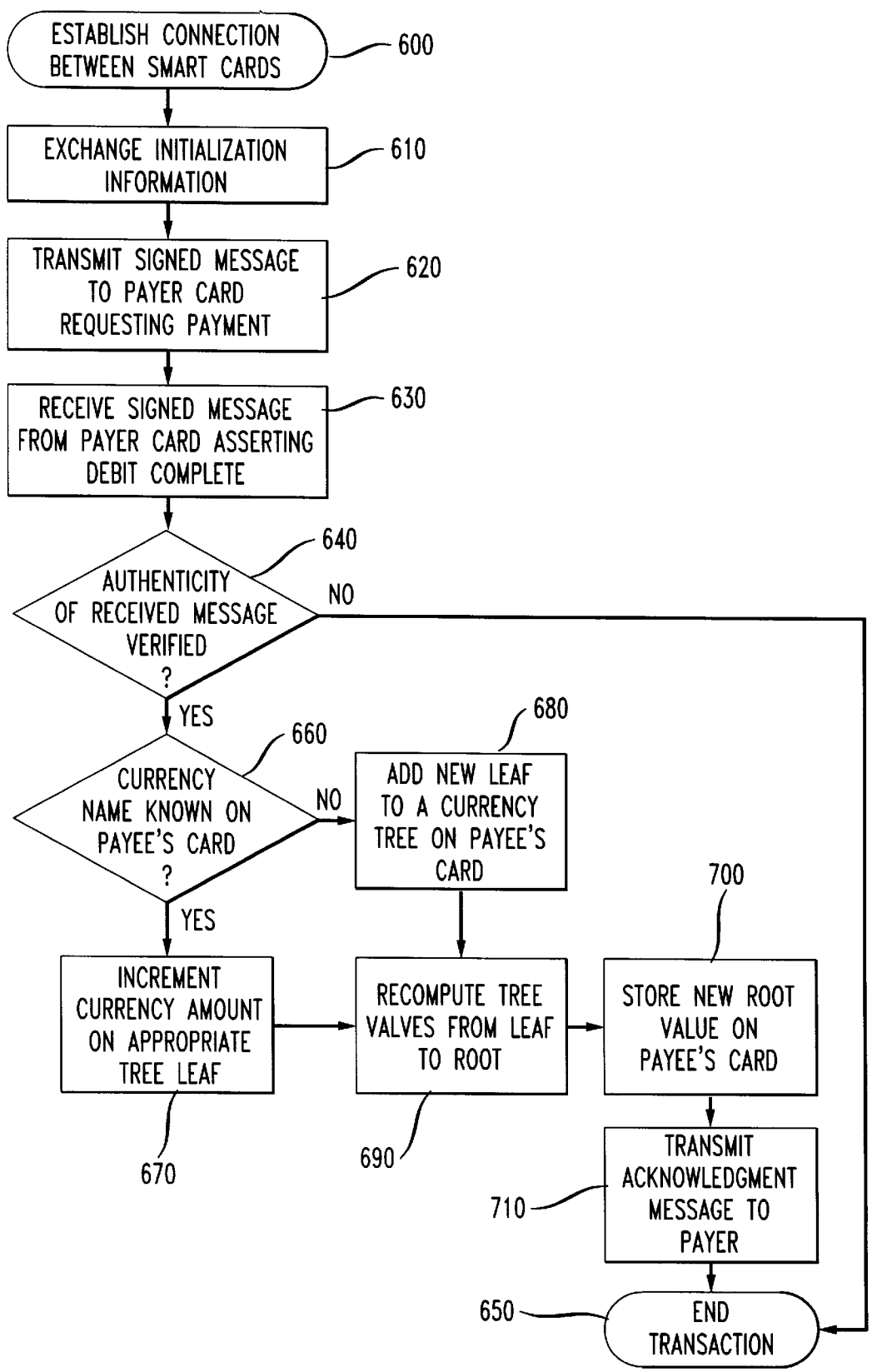

METHOD AND APPARATUS FOR DEFINING PRIVATE CURRENCIES

CROSS REFERENCE TO RELATED APPLICATIONS

This application claims the benefit of U.S. provisional application No. 60/065,962 filed Nov. 13, 1997, entitled "A Platform for Privately Defined Currencies, Loyalty Credits, and Play Money."

BACKGROUND OF THE INVENTION

A currency can be broadly defined as any medium of exchange. One of the most familiar currencies is the U.S. dollar. In the cash-based Unites States economy, dollars are the medium of exchange used for purchasing goods and services. For example, an employee may receive an amount of dollars in exchange for the services he or she provides to an employer. The employee may then exchange all or a portion of the dollars received from the employer for goods and/or services in the marketplace. In addition to the dollar, a number of other currencies exist in today's economy. These other currencies and the rules which dictate how they are exchanged may be established by an individual or an organization. Generally, these currencies fall into one of three categories: privately defined currencies, loyalty points, and play money.

An example of a privately defined currency is a scrip. A scrip is a currency established for exchanging goods or services within an organization. The organization establishing the scrip determines the rules for exchanging the scrip. These rules may include the value of the scrip relative to another currency (such as the dollar), the goods or services which may be exchanged for the scrip, and whether bearers may negotiate the scrip among themselves. Although the bearer of a particular amount of an established scrip may have initially used dollars to purchase the scrip, the scrip is used as the medium of exchange within the organization. For example, a public transportation authority may establish a scrip for use when obtaining transportation services from the organization. Transportation customers may initially use dollars to purchase tokens (scrip) from the transportation authority. However, to obtain access to a subway or bus system run by the transportation authority, the customer will either hand one or more tokens to a transportation authority employee or insert the tokens into a machine.

Similarly, other organizations (such as a private campus, a hospital or a prison) may establish a scrip for use as the medium of exchange for obtaining goods or services within their systems. In most cases the scrip has no value outside the system in which the scrip was established. For instance, subway tokens are not likely to be accepted to purchase candy at a local grocery store.

While establishing a scrip may be convenient to an organization, there are administrative costs associated with maintaining these systems. These costs may include salaries for employees who ensure machines properly accept the scrip, the cost of printing or minting the scrip, and the cost of delivering the scrip.

Loyalty points are another form of currency. When a customer purchases goods or services from a merchant, the merchant may grant the customer a certain number of loyalty points. Upon accumulating a certain number of the loyalty points, the customer may redeem the points for goods and/or services available from the merchant. Loyalty point systems are currently maintained by a wide variety of businesses including airlines, bookstores, and grocery stores. For example, air carriers have established a loyalty point program with a currency known as frequent flier points. Although the specifics of each program vary between air carriers, in general, a customer who purchases a ticket for air travel from an air carrier receives a certain number of frequent flier points for each mile flown on an airplane owned by that air carrier. The air carrier maintains records which reflect the number of points each customer has received. Upon accumulating an established amount of this currency, the customer may redeem the points for upgrades to first class seating, additional airline tickets, or other goods. The opportunity to obtain additional value from the purchased ticket encourages customers to continue traveling with the same air carrier in an effort to accumulate more frequent flier points. As with the scrip systems mentioned above, the organization which establishes a loyalty point system establishes the rules for negotiating in the currency.

Each loyalty point program usually issues a membership card to each participating customer. The membership card often includes an account number for tracking the number of loyalty points a customer has acquired. Consumers participating in more than one loyalty point program are disadvantaged by the inconvenience of having to keep track of multiple cards. As the number of cards increases, consumers are less likely to keep the cards in their immediate possession and are also likely to forget some of the programs in which they participate.

There are currently known systems for maintaining loyalty points on smart cards. Smart cards are about the size of a credit card and include computer chips which, among other functions, keep track of loyalty points. These systems, primarily in use in Europe, permit participation in multiple loyalty programs using one card. Nearly all credit cards in Europe are chip cards which possess the capacity to support loyalty programs. These chip cards are currently in wide circulation and are likely to be in the immediate possession of the owner most of the time. Unfortunately, most of these European smart card systems are closed systems. Further, these smart cards were not conceived to offer the flexibility of defining many different currencies using the same publicly available infrastructure and the same cryptographic functions. Thus, the process of establishing a new currency for use by everyone in possession of a smart card is cumbersome because a business or individual who wishes to define a new currency must either negotiate with whoever issues the smart cards or issue their own card.

Another type of currency is generally known as play money. Play money is established in the context of a game used for entertainment purposes. When the game is invented, a scarce resource is defined. This scarce resource may be considered a form of currency which can be won while playing the game or purchased by participants. Participants who are skilled at playing the game or otherwise possess an amount of the scarce resource may want to sell the resource or exchange an amount of the resource with other participants who may be less skilled at the game or who otherwise desire to obtain more of the resource.

"Aesir" and "Sanity's Edge" are examples of role-playing Internet games which include the process of bartering for scarce resources. These games, known as Multi-User Dimensions (MUD's), may be played against opponents over the Internet and involve obtaining ammunition and various types of weapons for use against other opponents. An additional dimension could be added to games similar to these if data representing scarce resources such as weapons or ammunition credits could be exchanged, for example, from skilled players who have acquired significant amounts of ammunition credits to less skilled players seeking more ammunition credits so they may continue participating in the game. Currently, the costs to establish an infrastructure so worldwide Internet participants in a game might exchange a scarce resource is not economically feasible for individual game inventors.

In view of the above, it can be appreciated that there is a need for a system which solves the above described problems by providing a publicly available and cost effective infrastructure supported by a cryptographic system which permits users to easily define and distribute new currencies.

SUMMARY OF THE INVENTION

One embodiment of the present invention includes a method and apparatus for establishing and distributing currencies. A user may establish a currency and store an initial amount of the currency on a smart card by visiting a web site supported by a system server. The system server is owned by a smart card issuer. Using a form downloaded from the web site, a user defines the characteristics of the currency and the rules for exchanging the currency. A cryptographic key management system permits smart cards to manage and manipulate numerous currencies arranged in currency trees.

The leaves of a currency tree contain the parameters which characterize the currency (such as the name of the currency, the type of currency, and the amount of currency). The tree root value is the numerical result of cryptographic "Hashing" operations performed along a path from the currency tree leaves to the root. The root value is the only value which needs to be stored on the smart card. Establishing a new currency on a smart card or distributing a currency to a smart card which has not been initialized with a currency entails adding a new leaf to a currency tree stored on the smart card and computing a new root value for the tree. If the smart card has already been initialized with the currency, transferring an amount of a particular currency to a smart card entails incrementing the amount of currency in the leaf corresponding to the currency and computing a new currency tree root value along the path from that leaf to the root.

The invention provides a publicly available infrastructure which permits organizations or individuals to define new currencies and share the administrative costs associated with maintaining a scrip, loyalty or play money currency system. These and other advantages and features of the invention will be more clearly understood by reference to the following detailed description of the invention, the appended claims and the several drawings attached herein.

BRIEF DESCRIPTION OF THE DRAWINGS

FIG. 6 illustrates a flow chart with steps for defining and distributing a currency in accordance with one embodiment of the invention.

DETAILED DESCRIPTION

Figure 1:
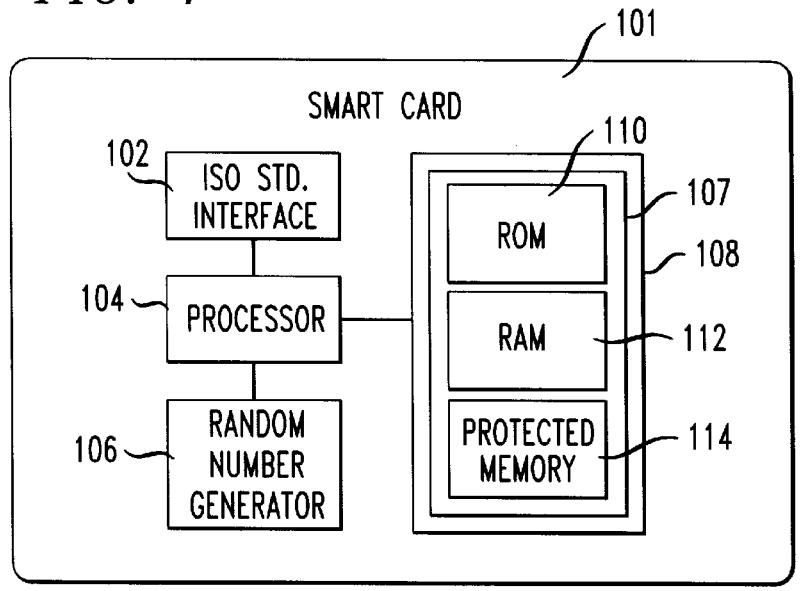
FIG. 1 is a block diagram of a smart card in accordance with one embodiment of the invention.

One aspect of an embodiment of the invention entails the universal distribution and accessibility of a portable storage medium or other trusted computing base in which properties of numerous currencies may be stored. FIG. 1 is a block diagram of a storage medium in accordance with one embodiment of the invention. Storage medium 101 (for example, a standard International Standards Organization (ISO) 7816 smart card) includes a processor 104 (for example, a Hitachi 3109, capable of performing cryptographic operations) connected to an ISO standard interface 102, a random number generating means 106 (for example, a random number generator) and a computer readable memory 108. Computer readable memory 108 includes a cryptographic module 107. Cryptographic module 107 includes a read only memory (ROM) segment 110, a non-volatile random access memory (NVM) segment 112 and a protected non-volatile memory (PNVM) segment 114. PNVM segment 114 reduces, in a known manner, the ability of unauthorized persons to access data stored therein.

Computer readable memory 108 includes computer program code segments which, when executed by processor 104, implement the main functionality of storage medium (smart card) 101. In the final stages of manufacturing smart card 101, processor 104 may execute programs stored in memory 108 to generate a unique secret card symmetric key (CSK) using random number generator 106 in a known manner. This CSK may be used with known symmetric ciphers (such as Data Encryption Standard (DES), Triple-DES, Internet Data Encryption Algorithm (IDEA), and RC5 by RSA Data Security, Inc.) to ensure the integrity of the information stored on smart card 101. Processor 104 may also execute programs stored in memory 108 to generate an asymmetric public/private key pair using random number generator 106 in a known manner. The asymmetric public/private key pair may be used with known asymmetric cipher systems (such as the Rivest Shamir Adleman (RSA) system and DSA) to identify smart cards which originated from a valid issuer.

The CSK may be used to encrypt the asymmetric public/private key pair. Once the asymmetric public/private key pair are encrypted, the CSK may be stored in PNVM segment 114 or another segment of memory 108. PNVM segment 114 is the preferred memory segment for storing the CSK.

After the asymmetric public/private key pair is encrypted, the private key may be stored in PNVM segment 114 or another segment of memory 108. The public key and a smart card unique identification (ID) number (which also may be generated during manufacture of smart card 101) may be certified or "signed" by the smart card manufacturer in a known manner. The manufacturer's certificate may bind the smart card ID number to the public key. Smart card 101 may then receive and store a unique chip certificate for use with the asymmetric key pair. The certificate may then be signed by the issuer using one of the issuer's RSA secret keys whose public counterpart is stored in memory 108 as a card issuer's public key (CIPK). Smart card 101 may store a number of card issuer's CIPKs. Alternatively, for cards with weak cryptographic function capabilities, the keys and accompanying certificate may be injected into the card rather than generated by programs stored on the card.

The infrastructure of the present invention utilizes a cryptographic key management system to define and dispense currencies. In the preferred embodiment, known cryptographic operations are conducted on binary signature trees (also referred to in this document as "Merkle Hash" or "currency" trees) similar to those described in U.S. Pat. No. 4,309,569 to Ralph C. Merkle. These currency trees store data associated with the currencies stored on smart card 101. Programs stored in memory 108 and executed by processor 104 construct the currency trees and store currency tree values in memory 108.

A card Application Programming Interface (API) may also be stored in memory 108. This API allows applications executed by processors in various interface devices to interact with smart card 101. These interface devices (such as personal computers, workstations, and point of sale (POS) interface devices) will be discussed in greater detail below.

Figure 2:
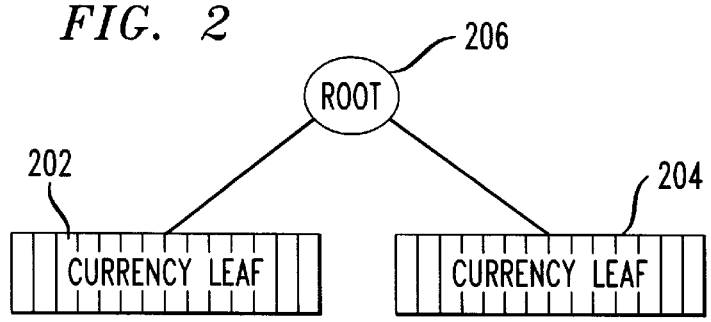
FIG. 2 illustrates an example of a binary signature tree in accordance with one embodiment of the present invention.

FIG. 2 illustrates an example of a binary signature tree in accordance with the invention. A root 206 of this currency tree is associated with leaves 202 and 204. Each leaf contains data (parameters) which characterize a particular currency. These parameters may include, for example: a name for the currency; the type of currency system (for example, directed currency which may only be redeemed with the originator or undirected currency which may be negotiated with any other holder of a smart card from the same issuer); the roles allowed by this particular user (originator of the currency, redeemer, consumer and etc.); the transaction sequence number (which represents the number of times a particular currency on this card has been transferred or received); an integer amount corresponding to the value of the currency owned by the bearer of this smart card; and any special permissions. Special permissions included within a leaf's data structure may, for example, define roles for the bearer of smart card 101. These roles may include any of the following: 1) bearer as an originator of a currency (and thus able to grant special permissions in a directed currency system), 2) bearer authorized to mint more of a particular currency, 3) bearer authorized to grant permission to mint more currency, 4) bearer authorized to dispense this particular currency to consumers in a directed currency system, 5) bearer authorized to redeem value in this particular currency in a directed currency system, and 6) bearer authorized to grant special permissions in a directed system. In one embodiment of the invention, an originator of a currency may use a permission granting protocol to set up special classes of cards authorized to dispense and redeem the currency.

Root 206 may be a value representing the result of a known cryptographic operation which was performed on the parameters stored in leaves 202 and 204. In the preferred embodiment, this cryptographic operation is known as a keyed Cipher Block Chaining (CBC Message Authentication Code (MAC). CBC is a known algorithm for applying a cryptographic function. The process of applying this algorithm to values in a currency tree to compute a root value is known as "Hashing." MAC is a known authentication method which may be implemented using the smart card's CSK in a known manner. Alternatively, MAC may be implemented using a public key shared with the card issuer by use of one of the issuer's CIPKs stored on the smart card. In the preferred embodiment of the invention, smart card 101 need only store a currency tree's root value in memory 108. The remaining currency tree values are stored in currency trees stored on smart card interface devices (such as POS interface devices), personal computers, or network appliances. Alternatively, a nonkeyed hash function could be used in place of the keyed MAC because the root of the currency tree is stored in a secure place on the smart card.

Figure 3:
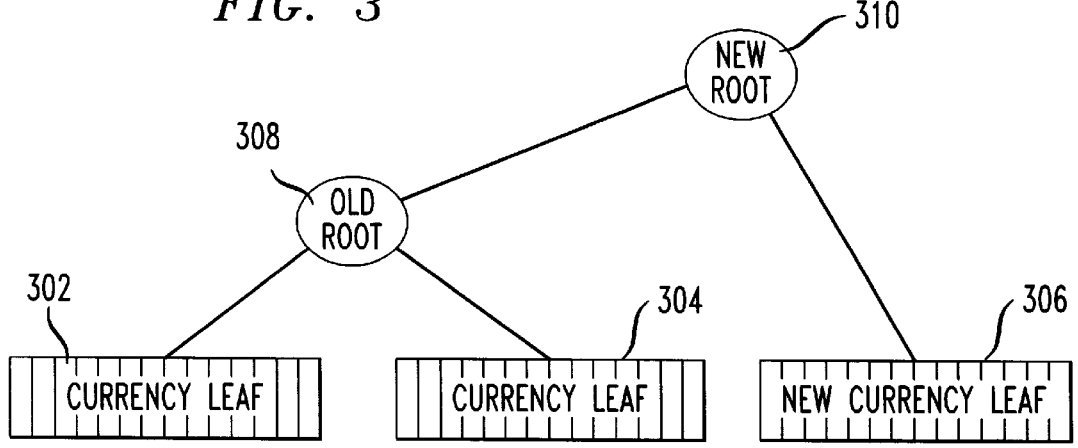
FIG. 3 illustrates the addition of a new currency to the binary signature tree of FIG. 2 in accordance with one embodiment of the present invention.

FIG. 3 illustrates the addition of a new currency to the binary signature tree of FIG. 2 in accordance with one embodiment of the present invention. A node (old root) 308 is associated with leaves 302 and 304. A root (new root) 310 is associated with node 308 and leaf 306.

Examples of transactions between smart cards will be discussed in greater detail below. If a smart card involved in a given transaction is exchanging value in a particular currency for the first time, a leaf containing parameters characterizing that currency is added to the smart card's currency tree (for less often used currencies, the leaf may be added to a currency tree stored on an interface device or personal computer). Cryptographic operations are then employed to calculate a new root value for that particular currency tree. In FIG. 3, after the addition of leaf 306 (representing the new currency), a cryptographic Hashing operation computes new root value 310 of this currency tree. The new root value 310 may then be stored in the smart card's memory. If the currency tree of FIG. 3 were larger (for example, the tree included more than three currencies), there may be intermediate nodes between the leaves at the base of the tree and the root at the top of the tree. In this case, the cryptographic Hashing operation may require computing new values at each node along the path from the new leaf to the root. Because all the data stored in each leaf is utilized in determining the associated root value, a change in any one of these leaf values may require Hashing operations to determine new values for any intermediate nodes on the path between the leaf and the root. Thus, both adding a new leaf to a currency tree and changing a leaf value in an existing leaf may require computing a new root value. In one embodiment of the invention, smart card 101 stores root values for each of a number of currency trees. Each of these currency trees may be manipulated by programs stored in memory 108 and executed by processor 104.

There are a number of advantages associated with implementing the preferred embodiment of the invention by employing cryptographic Hashing operations on Merkle Hash trees. First, the number of operations required to manipulate currency tree data on a smart card is represented by the relationship $\log_2(n)$, where n represents the number of currencies stored on a particular smart card currency tree. Thus, if there are 1,024 currencies stored in the Merkle Hash tree (n=1024), the smart card processor need only conduct 10 operations to determine a new root value for the tree. Second, the amount of memory space required to support a large number of currencies is reduced because only the root value of a currency tree needs to be stored on the smart card. Third, as further described below, establishing and distributing a new currency entails only the steps of adding a new leaf to a smart card currency tree and Hashing to determine a new root value. As described below, individuals can establish new currencies in this manner by accessing a web site. The newly established currency can then be distributed among other smart card users because the cryptographic operations needed to add new leaves and compute new root values can be executed by the processors on the smart cards.

Figure 4:
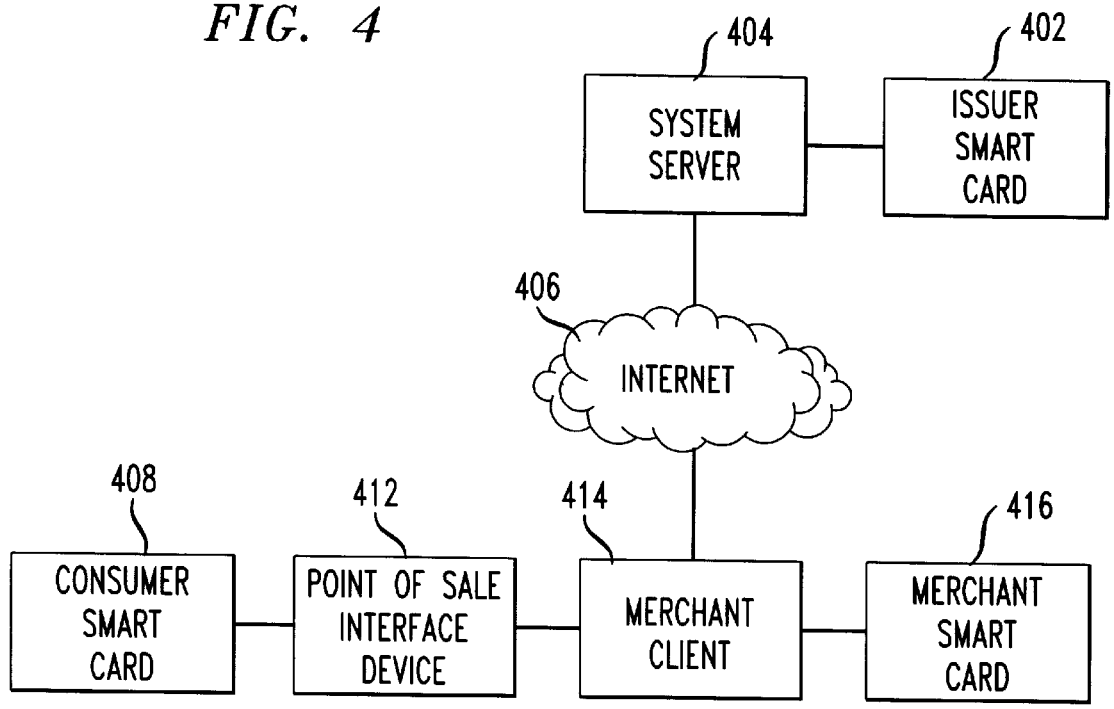
FIG. 4 is a block diagram of a system suitable for defining and distributing a currency in accordance with one embodiment of the invention.

Smart card 101 or a similar storage medium enables users to establish and distribute private currencies using the infrastructure (system) of the present invention. FIG. 4 is a block diagram of a system suitable for defining and distributing a currency in accordance with one embodiment of the invention. A system server 404 is adapted to interact with an issuer smart card 402 (for example, the smart card described with reference to FIG. 1) and is connected to network 406 (for example, the Internet). System server 404 is a general purpose computer equipped with a network interface module capable of communicating with a network using Transmission Control Protocol/Internet Protocol (TCP/IP). A merchant client 414 (for example, a desktop or laptop computer including a processor) is connected to a network 406 and is adapted to interact with a merchant smart card 416 (such as the smart card described with reference to FIG. 1). Merchant client 414 is connected to a POS interface device 412. POS interface device 412 is a known device for interacting with an ISO standard 7816 smart card.

In one embodiment of the present invention, POS interface device 412 is a hand-held device resembling a calculator which comprises a small keypad, a display, and one or two slots in which smart cards are inserted. Interface device 412 may also include a processor and non-volatile memory in which currency information is stored and managed by the user in conjunction with the capabilities of smart cards. Hundreds of currencies may be supported by the memory in interface device 412. The two slots in interface device 412 permit value to be exchanged between two cards.

Alternatively, interface device 412 may be a PC or other computer terminal which includes a smart card reader. This alternative embodiment of interface device 412 may be connected to a network. Non-volatile memory in the PC as well as in the network may store currency information that can be managed by an individual using his/her card. For both the above embodiments of interface device 412, a keyboard and display may support the command interface between the user and the smart card. Interface device 412 may maintain currency trees and even archive the currency trees on public servers. The archived versions may be consulted if a smart card is lost, corrupted or stolen. Interface device 412 may also execute programs to exchange segments of currency trees between currency trees stored on smart cards and currency trees not stored on smart cards.

An example of the process of defining a new currency in accordance with an embodiment of the invention will now be described with reference to FIG. 4. For the purpose of this example, assume the following: 1) system server 404 is owned by an issuer of smart cards similar to storage medium 101 described with reference to FIG. 1; 2) through system server 404 the card issuer maintains a web site which distributes forms to be executed by those wishing to define new currencies; and 3) a grocery store merchant (the user) wishes to establish a loyalty point system.

To begin the process of establishing a currency, the grocery store merchant will use merchant client 414 to access the uniform resource locator (URL) for the issuers web site supported by system server 404. The grocery store merchant will then download both a form and a program written in a programming language (such as Java) from the issuer's web site to merchant client 414. The Java program(s) interact with merchant smart card 416 and Common Gateway Interface (CGI) scripts interact with databases (not shown) associated with system server 404. The Java program carries out the currency definition protocol which enables the grocery store merchant to interactively provide the information required to complete the downloaded form. The interactive downloaded form will request the merchant to provide parameters which will define the new currency. These parameters may include: a name for the currency, a name for a unit of the currency, an initial amount of the currency, the roles allowed by this particular user (originator of the currency, redeemer, consumer, and etc.), whether more currency may be established in the future (with or without interacting with system server 404), the identity of the person(s) who will have authority to establish more of the currency (if more currency may be established in the future), and whether the currency will be directed or undirected.

Upon receiving these parameters from merchant client 414, system server 404 will check to ensure the name of the currency is unique. If the currency name is not already in use to define another currency, system server 404 will: 1) compute a new currency data structure; 2) sign the data structure using the secret key associated with one of the RSA CIPKs stored on merchant smart card 416; and 3) send the signed data structure to merchant client 414. Merchant client 414 then issues a card API command to accept the new currency structure. Merchant card 416 then verifies the authenticity of the currency structure using the CIPK, and adds the new currency as a new leaf on a local currency tree on merchant card 416 using the MAC key. This MAC key may be merchant card 416's CSK. New root values are then computed along the path from this new leaf to the root of the local currency tree. The new root value is then stored on merchant smart card 416. The remaining tree values may be stored on smart card 416 or on another device as discussed previously. Depending on the protocol, merchant smart card 416 may transmit an acknowledgment message to system server 404 to complete the transaction. Upon completion of the above cryptographic operations, merchant smart card 416 will be initialized with the currency parameters requested by the merchant and the initial amount of currency. The merchant (as originator of this currency) may now use cryptographic operations to distribute the currency to customers who posses a smart card from the same issuer and who wish to participate in this loyalty point system.

Referring to FIG. 4, before or during the process of making a purchase from the merchant, a customer will insert consumer smart card 408 into POS interface device 412. Merchant smart card 416 and consumer smart card 408 will implement cryptographic operations (similar to those described above between system server 404 and merchant smart card 416) to debit merchant smart card 416 and credit consumer smart card 408 with a merchant-defined amount of loyalty points proportional to the amount of money the consumer spent on the purchased goods. If smart card 408 has not exchanged these specific loyalty points on a previous occasion, a new leaf will be added to a currency tree on smart card 408 and a new root value will be computed. If smart card 408 has exchanged these specific loyalty points on a previous occasion, the appropriate leaf on a smart card 408 currency tree will be incremented and a new root value will be computed for that currency tree. In either case, the new root value will be stored in smart card 408's memory. Other currencies which may be present on smart card 408 will not be disturbed by the addition of this new currency (or increase in the amount of this currency).

If the merchant has defined the currency as "directed", the consumer will only be able to redeem this currency with this merchant. If the merchant has defined this currency as "undirected", the consumer may exchange the points with any other holder of a smart card from the same issuer (owner of system server 404) for any value he or she can negotiate. Unless the originator of the currency imposes specific restrictions (such as defining the currency as directed), the infrastructure of the invention permits an individual to exchange currencies of different types. Thus, grocery store loyalty points may be exchanged for book store or frequent flier loyalty points. The merchant may limit the other currencies which may be exchanged for this currency. For example, the merchant may determine that bearers of this currency may only redeem these loyalty points with this merchant and at a particular book store or air carrier for their loyalty points.

In an embodiment similar to that illustrated in FIG. 4, the merchant connects a POS interface device 412 to each cash register in one or more stores (POS interface device 412 may also be included within each cash register). The merchant may then distribute some of the original amount of loyalty points received from system server 404 to intermediate smart cards held by managers of individual stores. Each store manager may then distribute some of the loyalty points to smart cards at each POS interface device in the store they manage. In this manner, loyalty point transactions may take place at all designated cash registers owned by the merchant.

In another embodiment, POS interface device 412 is replaced with a network, such as the Internet. A consumer client (such as a desktop or laptop computer with a processor) is adapted to be connected to the network and adapted to interact with standard smart cards. The merchant may then credit a consumer's smart card with loyalty points from merchant smart card 416 via the Internet without requiring the customer to be present in one of the merchant's stores.

Figure 5:
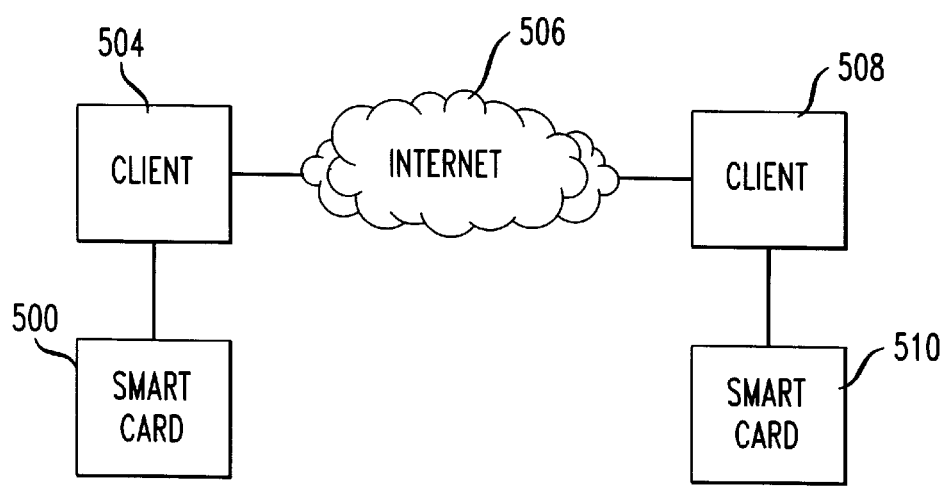
FIG. 5 is a block diagram of a system suitable for distributing currency among storage media in accordance with one embodiment of the invention.

FIG. 5 is a block diagram of a system suitable for distributing currency among storage media in accordance with one embodiment of the invention. FIG. 5 illustrates clients 504 and 508 (for example, laptop or desktop computers each including a processor) connected to a network 506 (for example, the Internet). Clients 504 and 508 are each adapted to interact with smart cards 500 and 510 (each similar to that described with reference to FIG. 1) respectively. According to this example, user 1 wishes to give user 2 an amount of his or her grocery store loyalty points. To exchange an amount of this undirected currency from smart card 500 to smart card 510, user 1 and user 2 will establish simultaneous connections to Internet 506 using clients 504 and 508. Either before or after connecting to Internet 506, each user will cause their respective clients to interact with their respective smart cards. Currency value may then be sent from one card to another using a value transfer protocol such as one of those specified in CEN standard 1546, part 2. These protocols are stored in memory segments on each of smart cards 500 and 510 and executed by their respective processors. Using these protocols, smart cards 500 and 510 will exchange transaction details (during a period known as "transaction initialization") including the certificates of their respective cards, the name of the currency, and the amount of currency to be transferred. Smart card 510 need not recognize the currency name at this point during the transaction initialization period because the card may not be initialized with that currency. In CEN 1546, smart cards 500 and 510 will exchange signed messages to complete the transfer. After transaction initialization, smart card 510 will transmit a formal signed message requesting payment of the grocery store loyalty points from smart card 500. Many of the payment details may be repeated in this message including the currency name, the amount of currency, and the transaction sequence numbers used to foil replay attacks. Next, smart card 500 will debit the currency amount, recompute the currency tree values from this leaf to the root of the currency tree in which the currency is stored, store the new root value for the currency tree in memory, and transmit a "signed" message ("signed" using smart card 500's private key) to smart card 510 asserting the debit has been made. Upon receiving this message transmitted from smart card 500 and verifying smart card 500's authenticity (in a known manner using the asymmetric key pairs discussed earlier), smart card 510 increments its currency value by the appropriate amount. If the currency name is unknown to smart card 510, a new leaf is automatically created for this currency in a currency tree. Smart card 510 will then recompute a new root value along the path up the currency tree from this leaf to the root and store this new root value in memory. In some variations of the protocol, smart card 510 will transmit a signed acknowledgment message to smart card 500 to complete the transfer and signify acceptance of the currency. The only interactions required by users 1 and 2 in this currency transfer entail user 1 using client 504 to specify the amount of currency to be paid to smart card 510. The smart card processors perform the remaining of the above steps.

FIG. 6 illustrates a flow chart with steps for defining and distributing a currency in accordance with one embodiment of the invention. These steps may be implemented, for example, as a computer program or as computer hardware using well-known signal processing techniques. If implemented in software, the computer program instructions are stored in computer readable memory, such as Read-Only Memory (ROM), Random Access Memory (RAM), magnetic disk (e.g, 3.5" diskette or hard drive), optical disk (e.g., CD-ROM) and so forth. In accordance with one embodiment of the present invention, the computer program instructions are executed by a smart card processor. In step 600, a connection is established between two smart cards. This connection may be established, for example, via a network (as described above) or via one or more previously described POS interface devices. In step 610, the smart cards will exchange initialization information. This initialization information may include the certificates from their respective cards, the name of the currency and the amount of the currency. In step 620, the payee card will transmit a signed message to the payer card requesting payment of the amount of currency. In step 630, the payee card will receive a signed message from the payer card asserting the payer card has debited the appropriate amount of the currency. In step 640, the payee card will verify the authenticity of the message received from the payer card using the asymmetric private/public key pairs as discussed above. If in step 640 the message is determined not to be authentic, the transaction is ended in step 650. If in step 640 the message is determined to be authentic, the payee card will determine (in step 660) if a leaf in an existing payee currency tree includes this particular currency's name. If the currency is already established on the payee's card, in step 670, the payee card will increment the amount of the currency in the currency leaf which represents the currency and proceed to step 690. If the currency name is not already established on the payee's card, a new leaf will be added to a payee card currency tree in step 680. In step 690, new tree values will be computed from the leaf to the root of the currency tree. In step 700, the new root value will be stored on the payee's card. In step 710, the transaction will be completed upon the payee card transmitting an acknowledgment message to the payer card.

Although various embodiments are specifically illustrated and described herein, it will be appreciated that modifications and variations of the present invention are covered by the above teachings and within the purview of the appended claims without departing from the spirit and intended scope of the invention. For example, although the three currency areas addressed in this document are of relatively low value, the invention is also applicable to higher value systems such as stock exchanges. Additionally, encapsulating the value transfer protocol described above in an Internet value transfer protocol or other protocol for added security is also envisioned by this disclosure. Finally, although this document explains the invention in the context of one smart card issuer, the invention anticipates multiple smart card issuers using the infrastructure.

What is claimed is:

1. A method for defining a currency for storage on at least one storage medium for dispensing the currency, comprising the steps of:
   receiving a currency definition form from a system server;
   modifying said form to include at least one currency parameter;
   sending said modified form to said system server;
   receiving at least one value characterizing the currency from said system server; and
   updating a first storage medium with said at least one value characterizing the currency and an initial amount of currency, wherein said updated first storage medium is used to dispense a portion of said initial amount of currency to at least one second storage medium.

2. The method of claim 1, further comprising the step of:
   updating at least one second storage medium with said at least one value characterizing the currency and a portion of said initial amount of currency.

3. The method of claim 2, wherein said first storage medium and said at least one second storage medium each include at least one binary signature tree, and wherein said step of updating said first storage medium and said step of updating said at least one second storage medium comprise the steps of:
   adding said at least one value characterizing the currency to said at least one binary signature tree, if said at least one value is not already included in said at least one binary signature tree;
   incrementing said at least one binary signature tree with an amount of the currency represented by said at least one value, if said at least one value is included in said at least one binary signature tree;
   calculating a new root value of said at least one binary signature tree; and
   storing said new root value in a memory of one of said first storage medium and said at least one second storage medium.

4. The method of claim 3, wherein said at least one binary signature tree is a Merkle Hash tree.

5. The method of claim 1, wherein said at least one currency parameter includes a requested currency name and a requested initial amount of currency.

6. The method of claim 5, further comprising the step of:
   verifying, at the system server, that said requested currency name is unique before the step of receiving said at least one value characterizing the currency.

7. The method of claim 3, wherein said at least one value characterizing the currency includes a currency name.

8. A method for defining a currency, comprising the steps of:
   receiving, from a client, a request for a currency definition form;
   transmitting said currency definition form in response to said request;
   receiving said currency definition form, including at least one currency parameter; and
   transmitting, to said client, at least one value characterizing the currency.

9. The method of claim 8, wherein said at least one currency parameter includes a requested currency name and a requested initial amount of currency.

10. The method of claim 9, further comprising the step of:
    verifying that said requested currency name is unique before the step of transmitting at least one value characterizing the currency.

11. A computer-readable medium whose contents cause a computer system to define a currency for storage on at least one storage medium for dispensing the currency, by performing the steps of:
    receiving a currency definition form from a system server;
    modifying said form to include at least one currency parameter;
    sending said modified form to said system server;
    receiving at least one value characterizing the currency from said system server; and
    updating a first storage medium with said at least one value characterizing the currency and an initial amount of currency, wherein said updated first storage medium is used to dispense a portion of said initial amount of currency to at least one second storage medium.

12. The computer-readable medium of claim 11, further performing the step of:
    updating at least one second storage medium with said at least one value characterizing the currency and a portion of said initial amount of currency.

13. The computer-readable medium of claim 12, wherein said first storage medium and said at least one second storage medium each include at least one binary signature tree, and wherein said step of updating said first storage medium and said step of updating said at least one second storage medium comprise the steps of:
    adding said at least one value characterizing the currency to said at least one binary signature tree, if said at least one value is not already included in said at least one binary signature tree;
    incrementing said at least one binary signature tree with an amount of the currency represented by said at least one value, if said at least one value is included in said at least one binary signature tree;
    calculating a new root value of said at least one binary signature tree; and
    storing said new root value in a memory of one of said first storage medium and said at least one second storage medium.

14. The computer-readable medium of claim 13, wherein said at least one currency parameter includes a requested currency name and a requested initial amount of currency.

15. The computer-readable medium of claim 14, further performing the step of:
    verifying that said currency name is unique before the step of transmitting said at least one value characterizing the currency.

16. A computer-readable medium whose contents cause a computer system to define a currency, by performing the steps of:
    receiving, from a client, a request for a currency definition form;
    transmitting said currency definition form in response to said request;
    receiving said currency definition form, including at least one currency parameter; and
    transmitting, to said client, at least one value characterizing the currency.

17. The computer-readable medium of claim 16, wherein said at least one currency parameter includes a currency name.

18. The computer-readable medium of claim 17, further performing the step of:
    verifying that said currency name is unique before the step of transmitting said at least one value characterizing the currency.

19. An apparatus for defining and distributing a currency, comprising:

a network;

a system server connected to said network, wherein said system server is adapted to interact with a first storage medium, said first storage medium including a first cryptographic module;

a client connected to said network, wherein said client is adapted to interact with a second storage medium, said second storage medium including a second cryptographic module; and an interface device connected to said client, wherein said interface device is adapted to interact with a third storage medium, said third storage medium including a third cryptographic module;

wherein the system server receives modified currency definition forms and stores a value in the first storage medium based upon information received in the definition forms.

20. The apparatus of claim 19, wherein said network is an Internet.

* * * * *